(12) United States Patent
Mukherjee

(10) Patent No.: US 11,428,839 B2
(45) Date of Patent: Aug. 30, 2022

(54) SYSTEMS AND METHODS FOR DETECTING A PROPPANT IN A WELLBORE

(71) Applicant: CARBO CERAMICS INC., Houston, TX (US)

(72) Inventor: Souvik Mukherjee, Katy, TX (US)

(73) Assignee: CARBO CERAMICS INC., Houston, TX (US)

( * ) Notice: Subject to any disclaimer, the term of this patent is extended or adjusted under 35 U.S.C. 154(b) by 439 days.

(21) Appl. No.: 16/728,773

(22) Filed: Dec. 27, 2019

(65) Prior Publication Data

US 2020/0209421 A1 Jul. 2, 2020

Related U.S. Application Data

(60) Provisional application No. 62/786,293, filed on Dec. 28, 2018.

(51) Int. Cl.
| | |
|---|---|
| *G06F 11/30* | (2006.01) |
| *G01V 3/08* | (2006.01) |
| *G06F 17/18* | (2006.01) |
| *E21B 49/00* | (2006.01) |
| *E21B 43/267* | (2006.01) |
| *E21B 47/13* | (2012.01) |
| *E21B 47/092* | (2012.01) |

(52) U.S. Cl.
CPC ............ *G01V 3/081* (2013.01); *E21B 43/267* (2013.01); *E21B 47/092* (2020.05); *E21B 47/13* (2020.05); *E21B 49/00* (2013.01); *G01V 3/08* (2013.01); *G06F 17/18* (2013.01)

(58) Field of Classification Search
CPC ................................ G06F 17/18; G01V 3/081
See application file for complete search history.

(56) References Cited

U.S. PATENT DOCUMENTS 9,250,351 B2 * 2/2016 Aldridge .................. G01V 3/30
2019/0211652 A1 * 7/2019 Camp ...................... E21B 49/00

FOREIGN PATENT DOCUMENTS

WO WO-2007112749 A1 * 10/2007 ......... G10L 21/0208

* cited by examiner

*Primary Examiner* — Phuong Huynh
(74) *Attorney, Agent, or Firm* — Patterson + Sheridan, LLP

(57) ABSTRACT

A method includes acquiring a first set of data before a proppant is pumped into a wellbore. The method also includes acquiring a second set of data after the proppant is pumped into the wellbore. The method also includes determining a weighted average median of the first set of data and of the second set of data. The method also includes determining a location of the proppant in a subterranean formation based at least partially upon the weighted average medians.

20 Claims, 7 Drawing Sheets

SYSTEMS AND METHODS FOR DETECTING A PROPPANT IN A WELLBORE

CROSS REFERENCE TO RELATED APPLICATIONS

This application claims priority to and the benefit of U.S. Provisional Application No. 62/786,293, filed Dec. 28, 2019, which is incorporated herein by reference in its entirety.

BACKGROUND

A proppant includes a plurality of particles dispersed in a fluid. The proppant is injected into a wellbore in a subterranean formation during or after a hydraulic fracturing operation. The particles in the proppant are designed to hold open fractures formed by the hydraulic fracturing operation.

Recently, some users have employed electrically-conductive proppants to help determine the location of the proppant (and thus the fractures) in the subterranean formation. Once the electrically-conductive proppant is injected, the user applies an electromagnetic (EM) field to the subterranean formation. One or more sensors then measure the response of the EM field, which may be analyzed to determine the location of the proppant (and the fractures). However, in a typical oilfield environment, there are other sources of electromagnetic fields, which may also be detected by the sensors. These other sources may represent noise, which may make determining the location of the proppant (and thus the fractures) more difficult. Therefore, what is needed is an improved system and method for determining the location of a proppant in a subterranean formation.

BRIEF SUMMARY

A method includes acquiring a first set of data before a proppant is pumped into a wellbore. The method also includes acquiring a second set of data after the proppant is pumped into the wellbore. The method also includes determining a weighted average median of the first set of data and of the second set of data. The method also includes determining a location of the proppant in a subterranean formation based at least partially upon the weighted average medians.

A method for determining a location of a proppant in a subterranean formation is also disclosed. The method includes acquiring a set of data from a sensor. The set of data includes a first portion corresponding to a first electromagnetic field introduced into the subterranean formation by an electric current source and a second portion corresponding to a second electromagnetic field introduced into the subterranean formation by equipment. The second portion is noise. The method also includes determining median values of one or more data points in the set of data using JackKnife statistics. The method also includes determining a likelihood that a selected data point of the one or more data points is a true median value of the set of data. The method also includes determining a weighted average of the median values based at least partially upon the likelihood, wherein the likelihood is used as a weighting factor. The method also includes determining a stacked value based at least partially upon the weighted average. The method also includes determining a location of a proppant in the subterranean formation based at least partially upon the stacked value using geophysical inversion.

A system for determining a location of a proppant in a subterranean formation is also disclosed. The system includes an electric current source configured to introduce an electric current into a subterranean formation at an injection point that is positioned in a wellbore. The electric current produces a first electromagnetic field. The system also includes a sensor configured to measure the first electromagnetic field and to produce a set of data therefrom. The system also includes a computing system configured to determine a weighted average median of the set of data and determine a location of the proppant in the subterranean formation based at least partially upon the weighted average median.

BRIEF DESCRIPTION OF THE DRAWINGS

The present invention may best be understood by referring to the following description and accompanying drawings that are used to illustrate embodiments of the invention. In the drawings.

DETAILED DESCRIPTION

Figure 1:
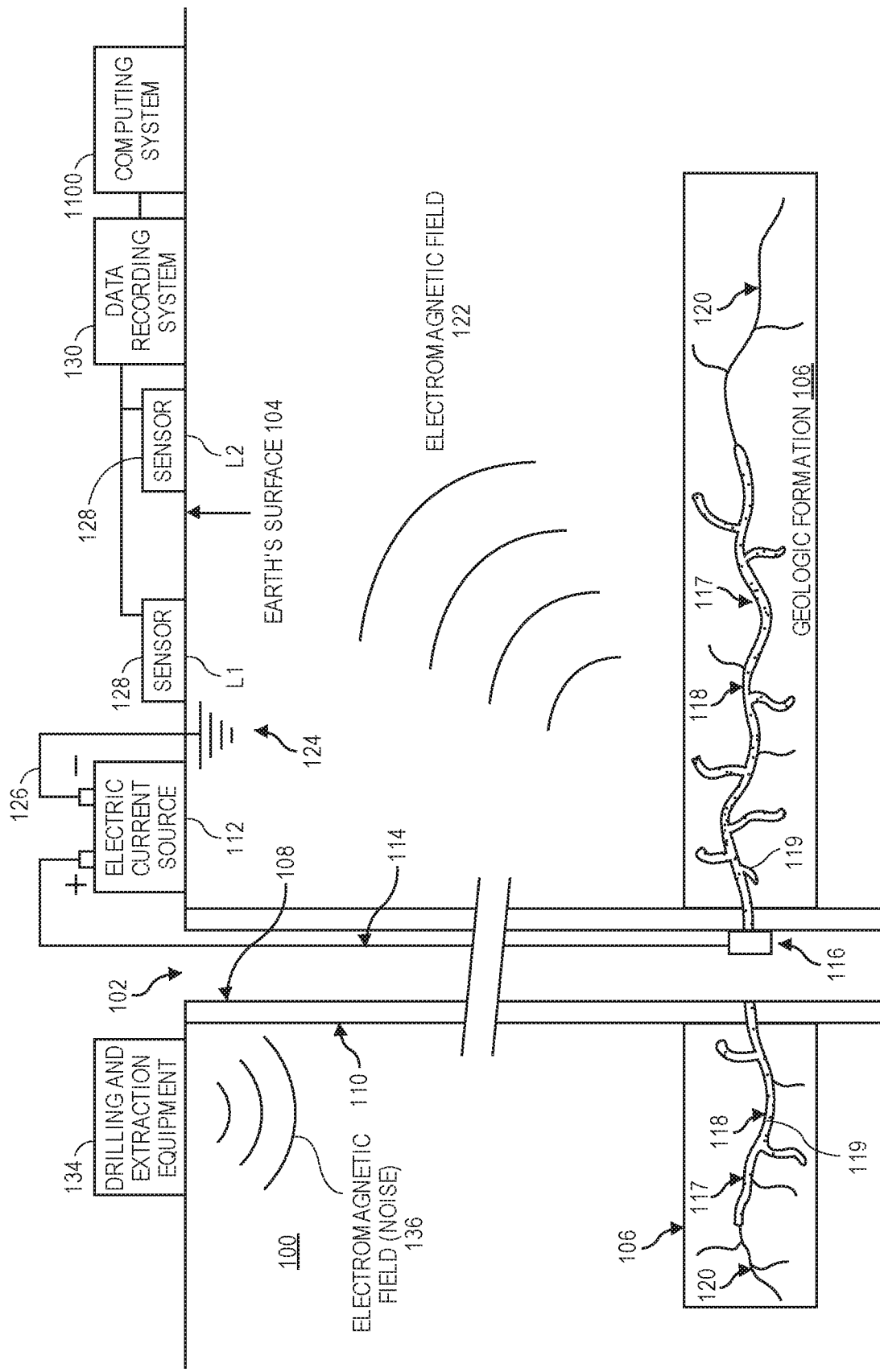
FIG. 1 illustrates a schematic view of a wellsite, according to an embodiment.

FIG. 1 illustrates a schematic view of a wellsite 100, according to an embodiment. The wellsite 100 includes a wellbore 102, which extends from the Earth's surface 104 to a subsurface geologic formation 106 that may contain oil, natural gas, and/or other geothermal resources. While the wellbore 102 is shown as being vertical in nature, it is to be understood that the wellbore 102 and/or the formation 106 may be vertical, horizontal, dipping, diagonal, slanting, or any combination thereof. The wellbore 102 may extend generally vertical to reach the subsurface formation 106 and then turn to extend horizontally or laterally through the formation 106. A well casing 108 may be positioned in the wellbore 102. Typically, the well casing 108 is formed of metal (e.g., steel). A cement stabilizer 110 may be formed to stabilize the well casing 108 in the wellbore 102. The cement stabilizer 110 stabilizes the casing 108 as fracture fluid and/or a proppant is pumped into the formation 106, possibly under high pressure. The cement stabilizer 110 can also stabilize the well casing 108 as natural gas, oil, or thermal fluids are extracted from the formation 106 by way of the wellbore 102.

Through utilization of a fracturing fluid under high pressure, a fracture 117 including first portions 118 and second portions 120 may be induced in the formation 106. In this embodiment, the fracture 117 is shown simplified as first and second portions 118; 120, however, it should be understood that the fracture 117 may contain several or multiple fractures, extending horizontally, vertically, and at various angles, and separate or branching from other induced fractures and combinations thereof. The fracture 117 may extend laterally and vertically some distance in one or more directions from wellbore 102. A proppant 119 is pumped into the wellbore 102 and fills or partially fills the first portions 118 of the fracture 117, thereby causing the first portions 118 to remain open (and thus causing the formation 106 to be more permeable for fluid flow). The proppant 119 filling the first portions 118 may be referred to as a "proppant pack." The second portions 120 of the fracture 117 are not filled by the proppant 119 and are typically filled with water, sand, gas, and/or other rock particles from the surrounding formation 106.

An electric current source 112, which may reside on the Earth's surface 104, is coupled to the casing 108 at a current injection (or current application) point 116 (e.g., positioned near the bottom of wellbore 102 and in contact with casing 108 proximate to the formation 106 and the first portion 118). In another embodiment, the electric current source 112 may reside on or below the surface 104. In another embodiment, the current injection point 116 may be located within the formation 106, but not in contact with first portion 118, or it may be located entirely outside the formation 106. Electric current is carried from the electric current source 112 to the injection point 116 via an insulated wire 114 within the wellbore 102. Alternately, the insulated wire 114 may be located on the exterior of the casing 108 (i.e., between the casing 108 and cement 110). In still another embodiment, the electric current source 112 may be located within wellbore 102 proximate to the current injection point 116. The electric current source 112 may be configured to generate current waveforms of various types (e.g., pulses, continuous wave, or repeating or periodic waveforms). Accordingly, the well casing 108 can be electrically energized and act as a spatially-extended source of electric current.

Some of the electric current generated by the electric current source 112 can travel from the well casing 108 through the proppant 119 of the induced fracture 117 of the formation 106. A first electromagnetic field 122 generated by the electric current can be altered by the presence of the proppant 119.

The proppant 119 can be selected to have electromagnetically suitable properties for generating, propagating, scattering, and/or altering electromagnetic fields that can be detected at the Earth's surface 104. For example, the proppant 119 may be selected to have a particular electrical permittivity, magnetic permeability, current conductivity, and/or other electromagnetic or mechanical properties that are different from the corresponding properties of the formation 106. In this way, the first portions 118 of the fracture 117 that are filled with the proppant 119 may have different electromagnetic properties from the second portions 120 of the fracture 117 not filled with the proppant 119, as well as the rock of the surrounding formation 106. The proppant 119 can, for example, be formed from an electrically-conductive material to enhance the electric conductivity of the first portion 118.

In one or more embodiments, at least a portion of the proppant 119 is electrically conductive, or conductive proppant. The conductive proppant can contain a coating of an electrically conductive material, such as a conductive polymer and/or metallic coating. Suitable conductive proppants and methods for their manufacture are disclosed in U.S. Pat. Nos. 8,931,553, 9,250,351, 9,434,875, 9,551,210, 9,927,549, and 10,106,732, the entire disclosures of which are incorporated herein by reference.

In one embodiment, all of the proppant 119 that is injected into the wellbore 102 and the fracture 117 can be formed from the conductive proppant material. However, this is merely illustrative. In various embodiments, the proppant 119 can include portions having different electromagnetic properties in different portions of the wellbore 102 and/or the fracture 117. For example, in some circumstances, it may be desirable to have conductive proppant in one portion of a fracture 117 (e.g., a portion of the fracture that is furthest from the wellbore 102 or a portion of the fracture 117 that is nearest to the wellbore 102) and non-conductive proppant in another portion of the fracture 117 or in the wellbore 102. In yet another example, in may be desirable to have proppant material with continuously or discretely varying electromagnetic properties as a function of the position of the proppant material in the fracture 117.

Providing proppant 119 having differing electromagnetic properties (e.g., non-conductive and conductive proppant) into the fracture 117 may include mixing conductive materials of differing concentrations into the proppant 119 as it is injected into the wellbore 102 in continuously or discretely varying time intervals or may include a first injecting conductive proppant into the wellbore 102 followed by injecting a non-conductive proppant. In an embodiment, the proppant 119 may include both conductive and non-conductive proppant materials. For example, the first five, ten, or twenty percent of the proppant material that is provided into the wellbore 102 may be conductive proppant, and the remaining ninety-five, ninety, or eighty percent of the proppant material that is provided into the wellbore 102 may be non-conductive proppant so that only the fracture 117 (or only a leading portion of the fracture 117) may be filled with the conductive portion of the proppant material. It should be appreciated that these examples are merely illustrative and that in general any electromagnetically suitable proppant material can be provided.

The electrically conductive material(s), or conductive material(s), can be or include any suitable magnetic or electrically conductive material(s). For example, the conductive materials can be or include pyrolytic carbon, carbon black, graphite, graphene, derivatives of graphene, petroleum coke, coke breeze, carbon fiber, fullerenes, or carbon nanotubes or any mixture or combination thereof. In one or more embodiments, the conductive materials can be or include any metal selected from Groups 3-13 of the Periodic Table, any alloys thereof and/or any oxides thereof. For example, the conductive materials can be or include aluminum, tin, iron, cobalt, copper, nickel, zinc, or oxides thereof, or any combination, mixture or alloy thereof. The conductive materials can also be or include ferromagnetic material.

The conductive materials can be in the form of particles having any suitable size and shape. In one or more embodiments, the conductive materials can be substantially spherical in shape, can have a fibrous material, can be polygonal shaped (such as cubic), can have an irregular shape, or any combination thereof. In one or more embodiments, the conductive materials can be substantially round and spherical. In one or more embodiments, the conductive materials can be in the form of particles, each having a size of about 0.001, about 0.01, about 0.1, about 0.5, about 1, about 5, about 10, or about 25 to about 50, about 75, about 100, about 150, about 200, about 250, about 500, about 750, or about 1,000 microns as measured in the particles largest dimension. For example, the conductive materials can be in the form of particles, each having a size of about 0.001 micron to about 0.1 micron, about 0.1 micron to about 5 microns, about 5 microns to about 25 microns, or from about 30 microns to about 100 microns. At least a portion of the particles can be in the form of discrete particles or in the form of an agglomeration of particles.

The non-conductive proppant can be a conventional proppant such as a ceramic proppant, sand, plastic beads and glass beads. Such conventional proppants can be manufactured according to any suitable process including, but not limited to continuous spray atomization, spray fluidization, spray drying, or compression. Suitable conventional proppants and methods for their manufacture are disclosed in U.S. Pat. Nos. 4,068,718, 4,427,068, 4,440,866, 5,188,175, and 7,036,591, the entire disclosures of which are incorporated herein by reference. In one or more exemplary embodiments, the proppant can be manufactured using a drip casting method. Suitable drip casting methods and proppants made therefrom are disclosed in U.S. Pat. Nos. 8,865,631, 8,883,693, 9,175,210, and 9,670,400, the entire disclosures of which are incorporated herein by reference. According to certain embodiments described herein, the proppants are made in a continuous process, while in other embodiments, the proppants are made in a batch process.

The electric current source 112 situated on the Earth's surface 104 generates electric current that flows down the insulated wire 114 to the current injection point 116 proximate to the formation 106 and the first portions 118 contained therein. As the injection point 116 is in direct physical contact with the well casing 108 and/or the first portions 118 of the fracture 117, the electric current can flow from the injection point 116 to the conductive well casing 108 and the first portions 118. Electric current flow within well casing 108 is generally vertically upwards and downwards from the injection point 116, whereas it is laterally outwards into the formation 106 within the first portions 118. The first electromagnetic field (e.g., waves) 122 generated by the electrical current in both the well casing 108 and the proppant 119 propagates to various locations in a three-dimensional volume of the Earth.

Electric currents associated with the first electromagnetic field 122 flow generally toward a current grounding point 124 situated on the Earth's surface 104. In another embodiment, the grounding point 124 may be located on or slightly beneath the Earth's surface 104 near to or far from the wellbore 102. In another embodiment, the grounding point 124 can be located beneath the surface 104 in another wellbore that is relatively near to or far from the wellbore 102. The other wellbore may or may not be used in the fracturing process. The grounding point 124 is connected to the electric current source 112 via an insulated wire 126. In this manner, the insulated wire 114, current injection point 116, well casing 108, first portions 118, first electromagnetic field 122 propagating within the Earth, grounding device 124, and/or insulating wire 126 constitute a "closed loop" that carries electric current from and ultimately back to the electric current source 112.

One or more sensors, such as sensors 128, are positioned on the surface 104 of the Earth. In another embodiment, the sensors 128 may be positioned on, above, or below the surface 104. The sensors 128 are used to detect the first electromagnetic field 122 (e.g., that propagates from the energized well casing 108 and the first portions 118 to the sensors 128). The sensors 128 include a transducer for sensing the first electromagnetic field 122.

The sensors 128 may be located at corresponding locations such as sensor locations L1 and L2. The sensors 128 may be deployed in a one-, two-, or three-dimensional distribution at or near the surface 104. For example, the sensors 128 may be positioned on the surface 104, beneath the surface 104, and/or suspended or mounted above the surface 104. Additionally, the sensors 128 may be deployed in various other subsurface wellbores located adjacent to, near to, or at some distance away from, the formation 106. In one or more embodiments, at least a portion of the sensors 128 may be located in the wellbore 102, such as on or in the casing 108. The sensors 128 may include various types of antennas and/or physical transducers appropriate for detecting electric fields and/or magnetic fields, and converting these physical signals to voltage that are subsequently forwarded to a data recording system 130. In particular, sensors commonly used for geophysical exploration or characterization purposes (e.g., porous pots, metal electrodes, electric/magnetic pickup coils, antennas) may be used.

The sensors 128 are connected to the data recording system 130. The data recording system 130 has the capability to receive, amplify, filter, digitize, process, and otherwise handle the voltage signals generated by sensors 128 in response to the incident first electromagnetic field 122. Additionally, the data recording system 130 may store these digitized and processed signals on an appropriate recording medium contained therein. Alternately, the data recording system 130 may transmit the received signals to a computing system 1100 where additional processing operations may be conducted and the data is/are stored therein. The computing system 1100 may be located proximate to the data recording system 130, or it may be situated in a remote location. Transmission of data between the recording system 130 and the computing system 1100 may be via an electrical wire, or via radio-transmission techniques.

The computing system 1100 may be used to generate and/or store a geophysical/geological model representing the three-dimensional volume of the Earth supporting the propagating first electromagnetic field 122 (which includes the particular formation 106 containing the fracture 117). It may also generate and/or store data corresponding to the known location of the current injection point 116, as well as the known amplitude and waveform of the electric current generated by the electric current source 112. It may also generate and/or store the known three-dimensional configuration of the wellbore 102 with associated casing 108 and cement 110, and the known locations of the sensors 128.

The sensors 128 may be used to gather electromagnetic field data before, during, and/or after the hydraulic fracturing and proppant injection operations. Equipment such as drilling and extraction equipment 134 for creating, reinforcing, pumping, extracting, or other drilling and/or extraction operations may be present in the vicinity of the wellbore 102. In at least one embodiment, the equipment 134 may also introduce a second electromagnetic field (e.g., waves)

136 into the formation 106, which may be detected by the sensors 128. As discussed in more detail below, the second electromagnetic field 136 may be considered to be noise, which may make determining the location of the proppant 119 and the fractures 117 more difficult.

The measurements/recordings, taken before and/or after fracturing and proppant insertion, can subsequently be used to determine the location of the first (e.g., proppant-filled) portion 118 of the fracture 117 within the formation 106. As used herein, the term "location" can refer to the position, geometry, and/or orientation of the fracture portion 118 relative to the surface 104, the wellbore 102, and/or the current injection point 116. The term "geometry" can refer to the size, shape, length, height, width, orientation, etc. portions of the first (e.g., proppant-filled) portions 118 of the fracture 117. The term "orientation" can refer to the orientation of at least a portion of the first (e.g., proppant-filled) portions 118 relative to the surface 104 or the wellbore 102 in the subsurface. Additional details regarding the wellsite 100 may be found in U.S. Pat. No. 9,250,351, the content of which is hereby incorporated by reference.

Figure 2:
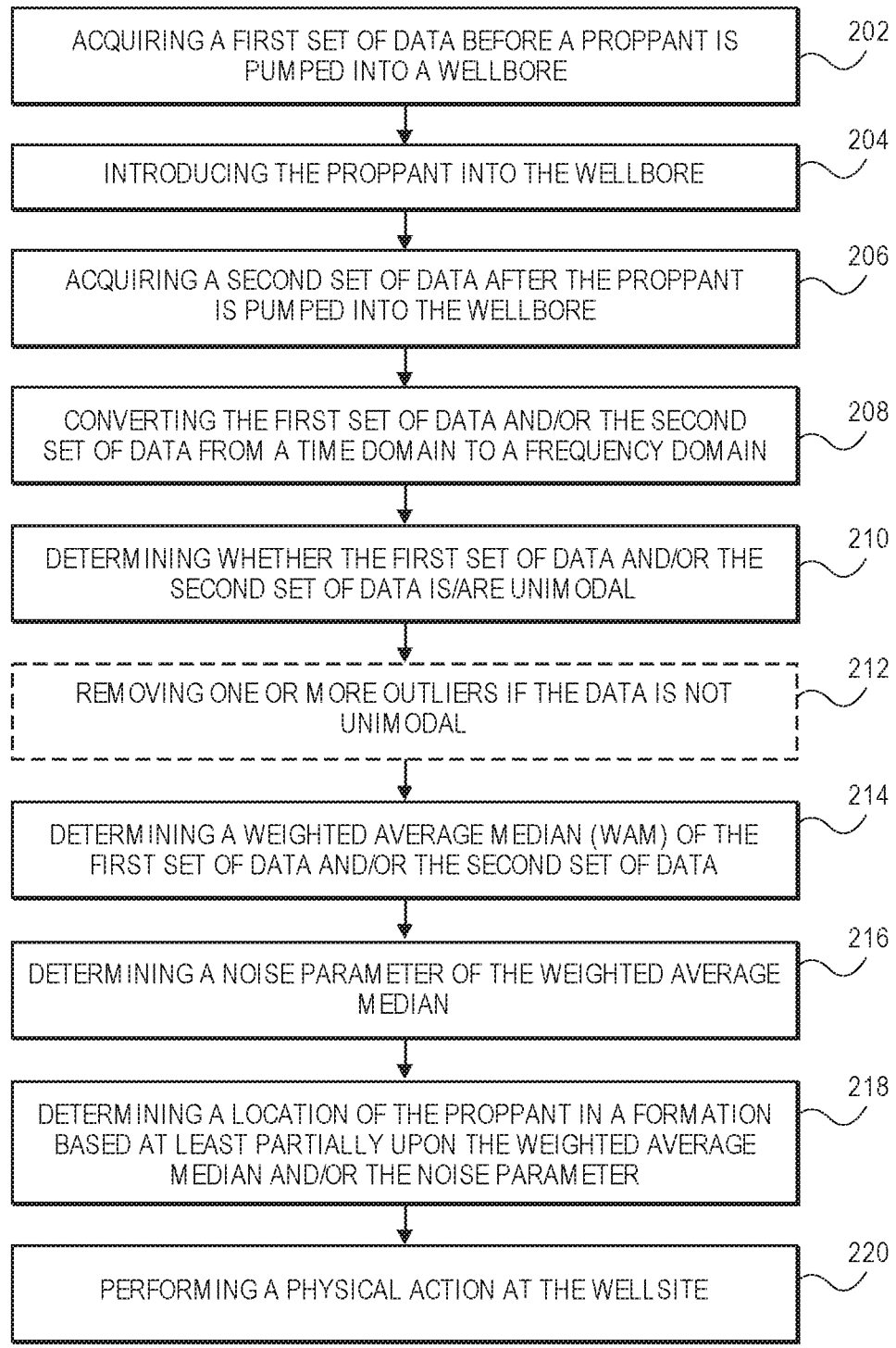
FIG. 2 illustrates a flowchart of a method for determining a location of a proppant (and thus fractures) in a formation, according to an embodiment.

FIG. 2 illustrates a flowchart of a method 200 for determining a location of the proppant 119 (and thus the fractures 117) in the formation 106, according to an embodiment. The method 200 may include acquiring (e.g., measuring and/or receiving) a first set of data before the proppant 119 is pumped/injected into the wellbore 102, as at 202. Acquiring the first set of data may include introducing an electrical current into the formation 106 using the electric current source 112. The electrical current may generate the first electromagnetic field 122 that is measured by the sensor(s) 128.

In at least one embodiment, in addition to measuring the first electromagnetic field 122 generated by the electrical current source 112, the sensor(s) 128 may also measure the second electromagnetic field 136 generated by the equipment 134 (e.g., drilling and extraction equipment). This second electromagnetic field 136 may be considered to be noise. The measurements of the (e.g., first and/or second) electromagnetic fields 122, 136 may be or include voltage vs. time measurements.

Figure 3:
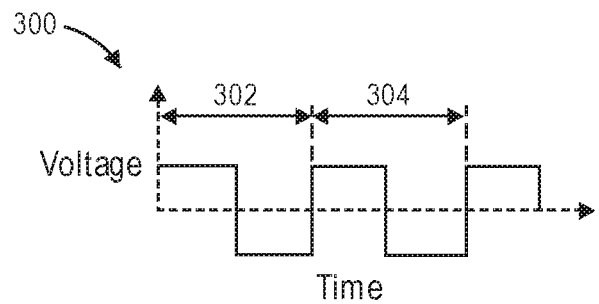
FIG. 3 illustrates a graph showing voltage vs. time measurements for a first electromagnetic field in the formation, according to an embodiment.

FIG. 3 illustrates a graph 300 showing voltage vs. time measurements of the first electromagnetic field 122 captured by the sensor(s) 128, according to an embodiment. The graph 300 represents a hypothetical scenario and therefore does not include the measurements of the second electromagnetic field 136 (i.e., the noise). In other words, the graph 300 is noise-free. As may be seen, the graph 300 is an oscillating square pulse sequence of voltage in the time domain. Because there is no noise present, the amplitude of the voltage is substantially equal in each cycle 302, 304.

Figure 4:
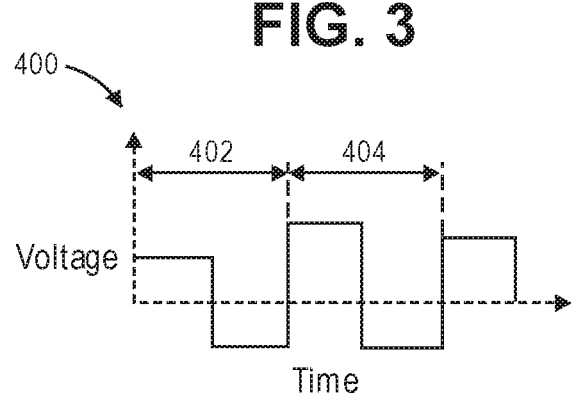
FIG. 4 illustrates a graph showing voltage vs. time measurements for the first electromagnetic field and a second electromagnetic field in the formation, according to an embodiment.

FIG. 4 illustrates a graph 400 showing voltage vs. time measurements of the first and second electromagnetic fields 122, 136 captured by the sensor(s) 128, according to an embodiment. Here, the graph 400 does include the measurement of the second electromagnetic field 136 (i.e., the noise). Similar to the graph 300, the graph 400 is an oscillating square pulse sequence of voltage in the time domain. However, due to the noise, the amplitude of the voltage varies in the different cycles 402, 404.

The measurements (e.g., of the first and second electromagnetic fields 122, 136) may be transmitted from the sensor(s) 128 to the data recording system 130 and/or the computing system 1100, which may process the measurements to produce the first set of data.

The method 200 may also include introducing (e.g., pumping, injecting, etc.) the proppant 119 into the wellbore 102, as at 204. The proppant 119 may flow into the first portion 118 of the fractures 117. The proppant 119 may include any of the properties discussed above. For example, the proppant 119 may be electrically-conductive such that the first electromagnetic field 122 is altered by the presence of the proppant 119.

The method 200 may also include acquiring (e.g., measuring and/or receiving) a second set of data after the proppant 119 is pumped/injected into the wellbore 102, as at 206. Acquiring the second set of data may be accomplished in a similar manner to acquiring the first set of data. The second set of data may also include the first and second electromagnetic fields 122, 136. However, now the first electromagnetic field 122 of the second set of data may include information related to the proppant 119 (e.g., due to the first electromagnetic field 122 being altered by the presence of the proppant 119 in the fractures 117).

The measurements captured by the sensor(s) 128 may look similar to the measurements in the graph 400 in FIG. 4; however, as will be appreciated, they may have different amplitudes due to the first electromagnetic field 122 being altered by the presence of the proppant 119 in the fractures 117. The measurements (e.g., of the first and second electromagnetic fields 122, 136) may be transmitted from the sensor(s) 128 to the data recording system 130 and/or the computing system 1100, which may process the measurements to produce the second set of data.

The method 200 may also include converting the first set of data and/or the second set of data from a time domain to a frequency domain, as at 208. FIG. 4 shows the first set of data in the time domain. As mentioned above, the second set of data may have a similar appearance but (e.g., slightly) different amplitudes.

Figure 5:
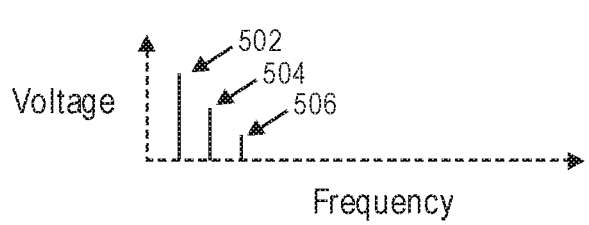
FIG. 5 illustrates a graph showing voltage vs. frequency measurements for the first and second electromagnetic fields, according to an embodiment.

FIG. 5 shows the first set of data (from FIG. 4) after being converted into the frequency domain. More particularly, FIG. 5 illustrates a graph 500 showing voltage vs. frequency measurements of the first set of data, according to an embodiment. A corresponding graph showing voltage vs. frequency measurements of the second set of data is not shown; however, as will be appreciated, the second set of data may have a similar appearance to FIG. 5 but (e.g., slightly) different amplitudes when converted into the frequency domain. The conversion into the frequency domain may be performed by the sensor(s) 128, the data recording system 130, and/or the computing system 1100. As may be seen, the graph 500 includes a plurality of voltage values. The largest voltage value 502 corresponds to the fundamental frequency of the first set of data (or the second set of data). The other, smaller voltage values 504, 506 correspond to harmonics thereof. Each of the voltage values 502, 504, 506 may correspond to a single cycle (e.g., cycle 402) in FIG. 4.

Figure 6:
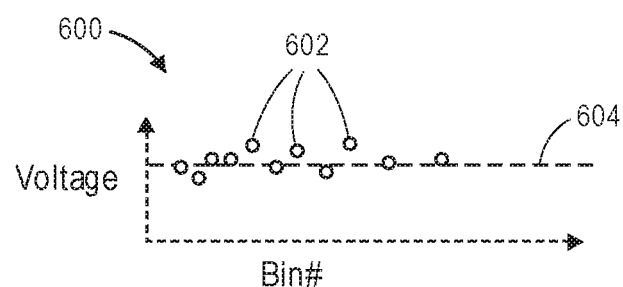
FIG. 6 illustrates a graph showing a spectral variation of a fundamental frequency voltage value for a single cycle from FIG. 5, according to an embodiment.

FIG. 6 illustrates a graph 600 showing a spectral variation of the fundamental frequency voltage value 502 (from FIG. 5) corresponding to a single cycle (e.g., cycle 402 from FIG. 4), according to an embodiment. As discussed above with respect to FIG. 4, there is a variation in the peak value of the voltage measured in different time cycles 402, 404. The spectral voltage value obtained by transforming an individual time cycle into the frequency domain (referred to as a "bin" in FIG. 6) may produce a corresponding variation from bin to bin (the bins are identified by reference number 602). These bins 602 can belong to the fundamental frequency or any of the odd harmonic frequencies obtained from the time series. The dotted line 604 corresponds to an average (i.e., mean, stacked) amplitude value for a given frequency in the spectra. As used herein, "spectra" refers to the distribution of amplitudes and/or other attribute values in frequency domain for a given time series.

The method 200 may also include determining whether the first set of data and/or the second set of data is/are unimodal, as at 210. The determination may be made by the data recording system 130 and/or the computing system 1100. As used herein, "unimodal data" refers to data having a distribution of values clustered around a single peak, or mode, and all other values occurring less frequently than this modal value. In at least one embodiment, unimodal data may have a Gaussian noise variation. More particularly, in a normal Gaussian distribution, the average and median values are the same as the modal value. As used herein, "average" and "mean" have the same meaning and are used interchangeably.

Figure 7:
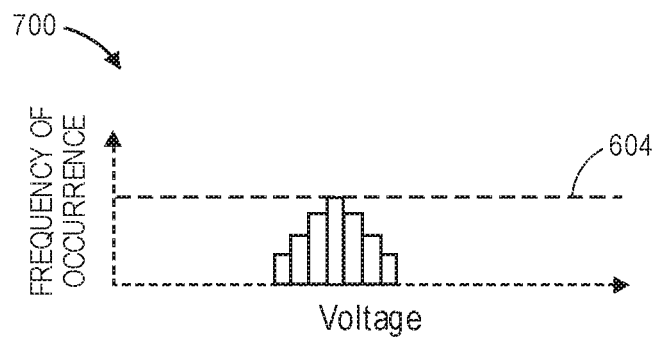
FIG. 7 illustrates a graph (e.g., a histogram) showing a unimodal average/stacked signal amplitude, according to an embodiment.

FIG. 7 illustrates a graph (e.g., a histogram) 700 showing a unimodal average (i.e., mean, stacked) signal amplitude, according to an embodiment. If the variation in amplitude (e.g. of the first set of data and/or the second set of data) in FIG. 6 is unimodal, then the histogram 700 in FIG. 7 may be used to show the spectra. In addition, if the variation in amplitude (e.g. of the first set of data and/or the second set of data) in FIG. 6 is unimodal, the method 200 may proceed to step 214 below. However, if the variation in amplitude (e.g. of the first set of data and/or the second set of data) in FIG. 6 is not unimodal, the method 200 may include removing one or more outliers, as at 212.

Figure 8:
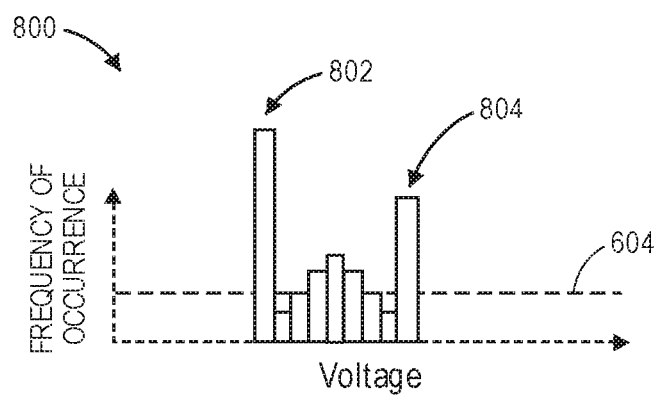
FIG. 8 illustrates a graph (e.g., a histogram) showing a non-unimodal average/stacked signal amplitude, according to an embodiment.

FIG. 8 illustrates a graph (e.g., a histogram) 800 showing a non-unimodal average (i.e., mean, stacked) signal amplitude, according to an embodiment. The graph 800 may be similar to the graph 700; however, the graph 800 may include one or more strong outliers 802, 804 that distort the stacked output. As used herein, an "outlier" refers data points whose values exceed the median or modal values by an order of magnitude or more. The outliers 802, 804 may be caused by the noise (e.g., from the equipment 134). The outliers 802, 804 may be removed from the stacked output to allow for a more accurate signal estimate.

Once the first set of data and/or the second set of data is/are determined to be unimodal, the method 200 may include determining a Weighted Average Median (WAM) of the first set of data and/or the second set of data, as at 214. Utilization of JackKnife statistics to determine the Weighted Average Median (JKWAM) allows for a more robust method of stacking, which helps reduce the influence of human bias that may be introduced after the selective removal of potential outliers 802, 804. JackKnife statistics is a mathematical resampling technique that is useful for variance and bias estimation. For example, JackKnife statistics may be used to select statistical attributes such as mean, median, and/or mode of a sample data set. It utilizes the principle of replacing individual data points in the sample by the mean, median, mode, or any other statistical attribute of the remaining data points.

Determining the weighted average median (e.g., using JackKnife statistics) of the first set of data and/or the second set of data may include determining (e.g., JackKnife) median values of one or more data points (e.g., one or more of points 602 in FIG. 6) in the first set of data and/or the second set of data.

Determining the weighted average median (e.g., using JackKnife statistics) of the first set of data and/or the second set of data may also include determining a likelihood that a selected data point (e.g., a selected one of the points 602 in FIG. 6) is the true median value of the first set of data and/or the second set of data. As used herein, a "true median value" differs from a "median value" in the preceding paragraph in that the true median value is the median of the entire population, as opposed to the median of the sample data set. The likelihood may be determined, for example, using a folded cumulative distribution formula for a Gaussian distribution.

Figure 9:
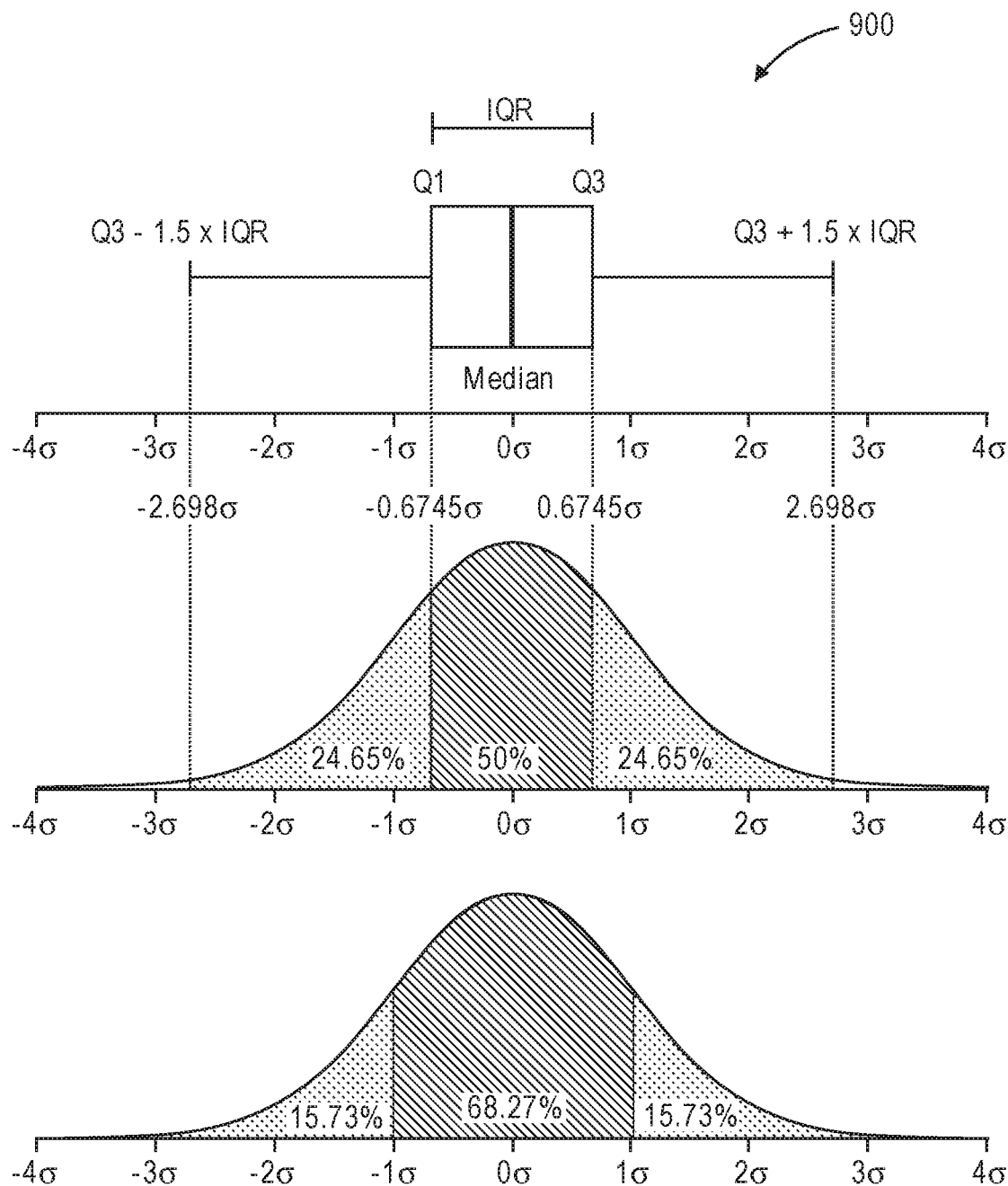
FIG. 9 illustrates an example of a normal, Gaussian probability density function, according to an embodiment.
Figure 10:
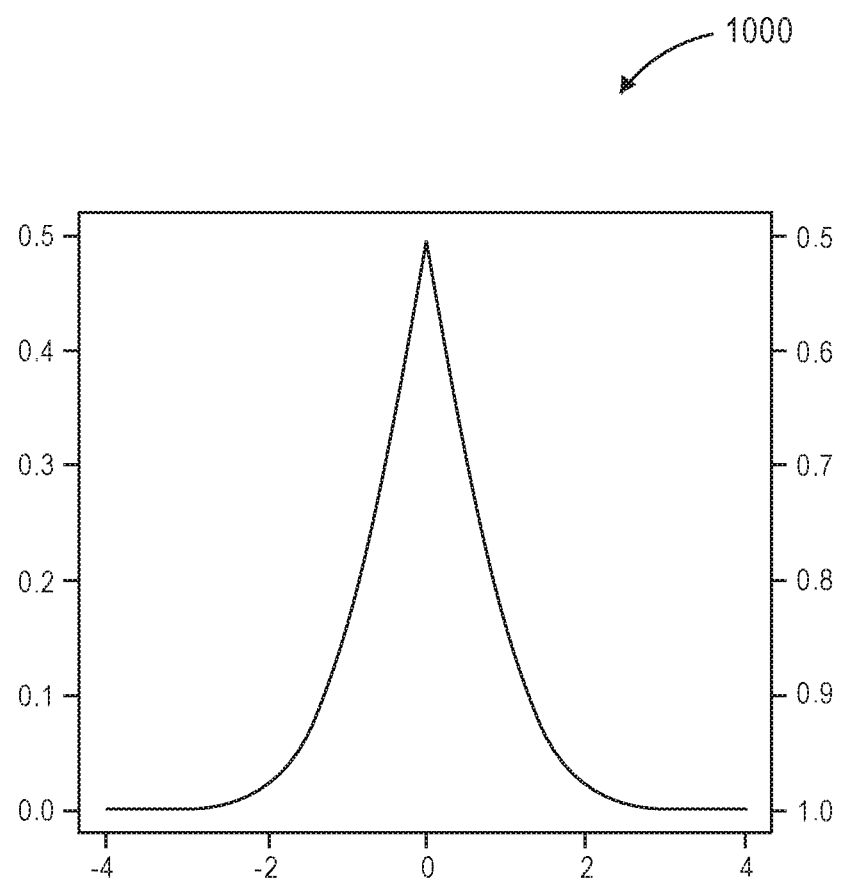
FIG. 10 illustrates an example of a folded cumulative probability distribution function, according to an embodiment.

FIG. 9 illustrates an example of a normal Gaussian probability density function 900, and FIG. 10 illustrates an example of a folded cumulative probability distribution function 1000, according to an embodiment. The folded cumulative distribution formula is determined as a combination of the standard normal cumulative distribution function F(x) and its complement Q(x), also known as the cumulative probability of non-exceedance. F(x) is given by the equation $$F(x) = \Phi\left(\frac{x-\mu}{\sigma}\right) = \frac{1}{2}\left[1 + erf\frac{x-\mu}{\sigma\sqrt{2}}\right] \quad \text{Equation (1)}$$

where F represents density, μ represents the mean (i.e., average), σ represents the deviation, x represents a given sample data point, and Φ is the representative function of z-score of x. The z-score of a sample data point represents how many standard deviations away from the mean the data point is. For example, a z-value of 1 will mean that 'x' is 1 standard deviation away from the mean of the sample data set. Q(x) is the complementary equation of F(x) and is given as:

$$Q(x)=1-\Phi(x) \quad \text{Equation (2)}$$

Determining the weighted average median (e.g., using JackKnife statistics) of the first set of data and/or the second set of data may also include determining a weighted average of the (e.g., JackKnife) median values based at least partially upon the determined likelihoods, where the determined likelihoods may be used as weighting factors. A final stacked value of the population may then be determined based at least partially upon the weighted average. The utilization of a weighted average of median values and/or a final stacked value is a unique approach to determining the stacked signal value of a geophysical signal.

The method 200 may also include determining a noise parameter of the weighted average median (e.g., of the final stacked value), as at 216. The noise parameter may be or include a standard error of the weighted average of the median values. The noise parameter may be determined by determining the standard deviation of the population or the average of the JackKnife standard deviations of all the points in the population. The standard deviation divided by the square root of the number of samples in the population provides the Standard Error of the Mean (SEM).

The method 200 may also include determining a location of the proppant 119 in the formation 106 based at least partially upon the weighted average median and/or the noise parameter, as at 218. More particularly, this may include determining the location of the proppant 119 in the first portions 118 of the fractures 117 in the formation 106 based at least partially upon the weighted average median (e.g., the final stacked value) and/or the noise parameter. In one example, one or more portions of the method 200 may be used as an input to an algorithm which then determines the location and the geometry of the fracture 117 using the methods of geophysical inversion. In this example, the application of the method 200 prior to the geophysical inversion leads to higher confidence results regarding the location and geometry of the (e.g., first portions 118 of the) fracture 117.

The method 200 may also include performing a physical action at the wellsite 100, as at 220. The physical action may be performed in response to the location and/or geometry of the (e.g., first portions 118 of the) fracture 117. The physical action may be or include determining a placement of a future wellbore, drilling a future wellbore, determining a spacing of a fracture treatment in the wellbore 102 or the future wellbore, performing the fracture treatment in the wellbore 102 or the future wellbore, or a combination thereof.

Figure 11:
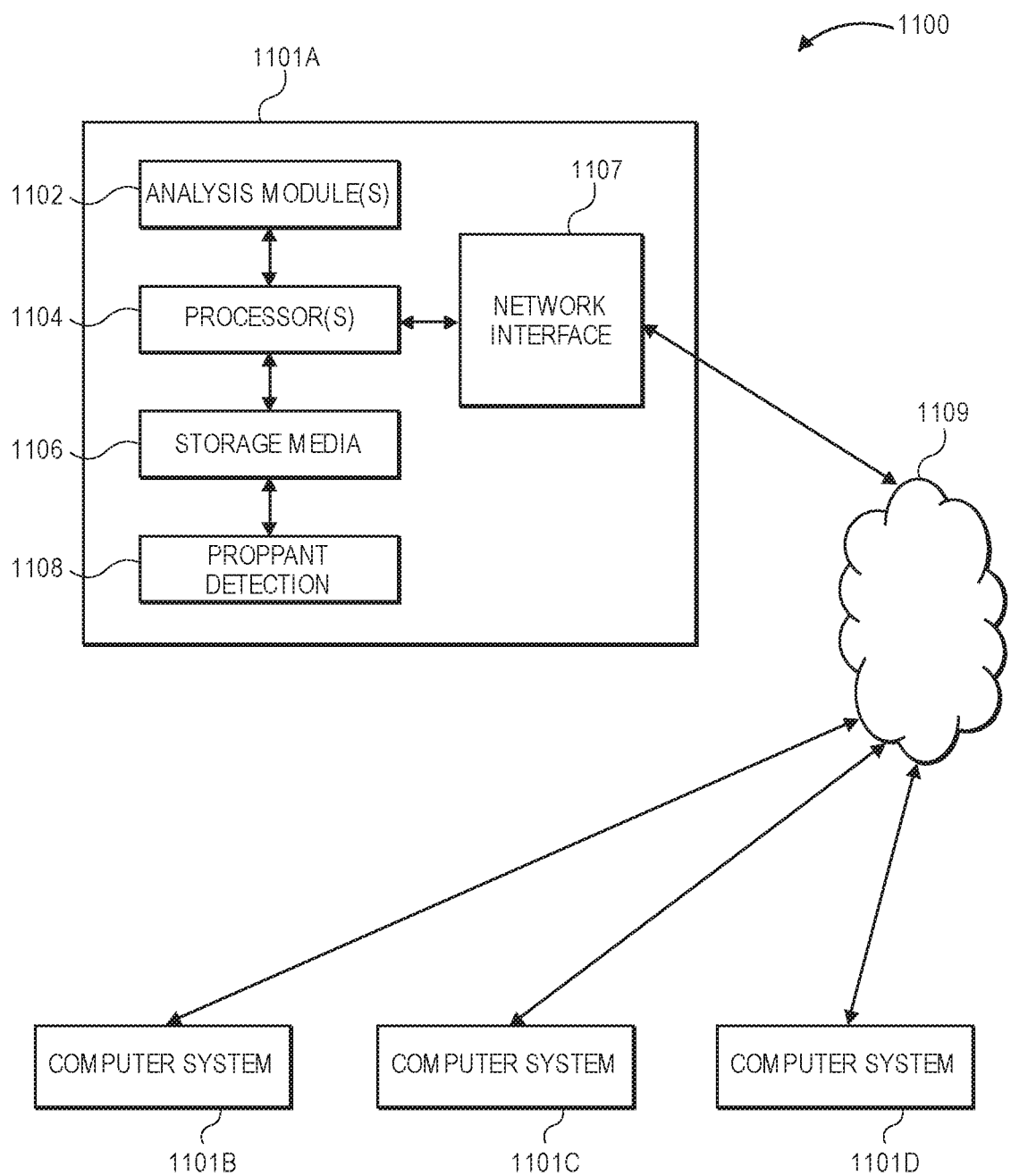
FIG. 11 illustrates an example of a computing system for performing at least a portion of the method, in accordance with some embodiments.

FIG. 11 illustrates an example of such the computing system 1100, in accordance with some embodiments. The computing system 1100 may include a computer or computer system 1101A, which may be an individual computer system 1101A or an arrangement of distributed computer systems. The computer system 1101A includes one or more analysis modules 1102 that are configured to perform various tasks according to some embodiments, such as one or more methods disclosed herein. To perform these various tasks, the analysis module 602 executes independently, or in coordination with, one or more processors 1104, which is (or are) connected to one or more storage media 1106. The processor(s) 1104 is (or are) also connected to a network interface 1107 to allow the computer system 1101A to communicate over a data network 1109 with one or more additional computer systems and/or computing systems, such as 1101B, 1101C, and/or 1101D (note that computer systems 1101B, 1101C and/or 1101D may or may not share the same architecture as computer system 1101A, and may be located in different physical locations, e.g., computer systems 1101A and 1101B may be located in a processing facility, while in communication with one or more computer systems such as 1101C and/or 1101D that are located in one or more data centers, and/or located in varying countries on different continents).

A processor may include a microprocessor, microcontroller, processor module or subsystem, programmable integrated circuit, programmable gate array, or another control or computing device.

The storage media 1106 may be implemented as one or more computer-readable or machine-readable storage media. Note that while in the example embodiment of FIG. 11 storage media 1106 is depicted as within computer system 1101A, in some embodiments, storage media 1106 may be distributed within and/or across multiple internal and/or external enclosures of computing system 1101A and/or additional computing systems. Storage media 1106 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, computing system 1100 contains one or more proppant detection module(s) 1108. In the example of computing system 1100, computer system 1101A includes the proppant detection module 1108. In some embodiments, a single proppant detection module may be used to perform some aspects of one or more embodiments of the methods disclosed herein. In other embodiments, a plurality of proppant detection modules may be used to perform some aspects of methods herein.

It should be appreciated that computing system 1100 is merely one example of a computing system, and that computing system 1100 may have more or fewer components than shown, may combine additional components not depicted in the example embodiment of FIG. 11, and/or computing system 1100 may have a different configuration or arrangement of the components depicted in FIG. 11. The various components shown in FIG. 11 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of the present disclosure.

Computational interpretations, models, and/or other interpretation aids may be refined in an iterative fashion; this concept is applicable to the methods discussed herein. This may include use of feedback loops executed on an algorithmic basis, such as at a computing device (e.g., computing system 1100, FIG. 11), and/or through manual control by a user who may make determinations regarding whether a given step, action, template, model, or set of curves has become sufficiently accurate for the evaluation of the subsurface three-dimensional geologic formation under consideration.

It is understood that modifications to the invention may be made as might occur to one skilled in the field of the invention within the scope of the appended claims. All embodiments contemplated hereunder which achieve the objects of the invention have not been shown in complete detail. Other embodiments may be developed without departing from the spirit of the invention or from the scope of the appended claims. Although the present invention has been described with respect to specific details, it is not intended that such details should be regarded as limitations on the scope of the invention, except to the extent that they are included in the accompanying claims.

What is claimed is:

1. A method, comprising:
   acquiring a first set of data before a proppant is pumped into a wellbore;
   acquiring a second set of data after the proppant is pumped into the wellbore;
   determining a weighted average median of the first set of data and a weighted average median of the second set of data; and determining a location of the proppant in a subterranean formation based at least partially upon the weighted average median of the first set of data and the weighted average median of the second set of data.

2. The method of claim 1, wherein acquiring the first set of data comprises:
introducing an electric current into the subterranean formation using an electric current source, wherein the electric current generates a first electromagnetic field in the subterranean formation; and
measuring the first electromagnetic field with a sensor located at or near Earth's surface.

3. The method of claim 2, further comprising introducing a second electromagnetic field in the subterranean formation, wherein the sensor measures the second electromagnetic field, and wherein determining the weighted average medians of the first and second sets of data is used to at least partially filter the second electromagnetic field out of the first and second sets of data.

4. The method of claim 2, wherein the proppant is electrically-conductive.

5. The method of claim 1, further comprising converting the first and second sets of data from a time domain into a frequency domain before determining the weighted average medians of the first and second sets of data.

6. The method of claim 1, further comprising:
determining that the first and second sets of data are not unimodal; and
removing one or more outliers from the first set of data and second set of data prior to determining the weighted average median of the first set of data and the weighted average median of the second set of data.

7. The method of claim 1, wherein determining the weighted average median of the first set of data comprises determining median values of one or more data points in the first set of data using a mathematical resampling technique configured for variance and bias estimation.

8. The method of claim 7, wherein determining the weighted average median of the first set of data also comprises determining a likelihood that a selected data point of the one or more data points is a true median value of the first set of data.

9. The method of claim 8, wherein the likelihood is determined using a folded cumulative distribution formula for a Gaussian distribution.

10. The method of claim 9, wherein the folded cumulative distribution formula is determined as a combination of a standard normal cumulative distribution function and the function's complement.

11. The method of claim 10, wherein the standard normal cumulative distribution function (F(x)) is determined by Equation (1):

$$F(x) = \Phi\left(\frac{x-\mu}{\sigma}\right) = \frac{1}{2}\left[1 + \operatorname{erf}\frac{x-\mu}{\sigma\sqrt{2}}\right] \quad \text{Eq. (1)}$$

wherein F represents density, $\mu$ represents mean, $\sigma$ represents deviation, x represents a sample data point, and $\Phi$ is a representative function of z-score of x, and wherein the complement (Q(x)) is determined by Equation (2):

$$Q(x) = 1 - \Phi(x) \quad \text{Eq. (2)}.$$

12. The method of claim 8, wherein determining the weighted average median of the first set of data comprises determining a weighted average of the median values based at least partially upon the likelihood, and wherein the likelihood is used as a weighting factor.

13. The method of claim 12, wherein determining the weighted average median of the first set of data also comprises determining a stacked value based at least partially upon the weighted average.

14. The method of claim 1, wherein the location of the proppant is determined using geophysical inversion.

15. The method of claim 1, further comprising performing a physical action in response to determining the location of the proppant in the subterranean formation.

16. A method for determining a location of a proppant in a subterranean formation, comprising:
acquiring a set of data from a sensor, wherein the set of data comprises:
a first portion corresponding to a first electromagnetic field introduced into the subterranean formation by an electric current source; and
a second portion corresponding to a second electromagnetic field introduced into the subterranean formation by equipment, wherein the second portion comprises noise;
determining median values of one or more data points in the set of data using a mathematical resampling technique that is configured for variance and bias estimation;
determining a likelihood that a selected data point of the one or more data points is a true median value of the set of data;
determining a weighted average of the median values based at least partially upon the likelihood, wherein the likelihood is used as a weighting factor;
determining a stacked value based at least partially upon the weighted average; and
determining a location of a proppant in the subterranean formation based at least partially upon the stacked value by using geophysical inversion.

17. A system for determining a location of a proppant in a subterranean formation, comprising:
an electric current source configured to introduce an electric current into a subterranean formation at an injection point that is positioned in a wellbore, wherein the electric current is configured to produce a first electromagnetic field;
a sensor configured to measure the first electromagnetic field and to produce a set of data therefrom; and
a computing system configured to:
determine a weighted average median of the set of data; and
determine a location of the proppant in the subterranean formation based at least partially upon the weighted average median.

18. The system of claim 17, wherein determining the weighted average median of the set of data comprises determining median values of one or more data points in the set of data using a mathematical resampling technique that is configured for variance and bias estimation.

19. The system of claim 18, wherein determining the weighted average median of the set of data also comprises determining a likelihood that a selected data point of the one or more data points is a true median value of the set of data.

20. The system of claim 19, wherein determining the weighted average median of the set of data also comprises determining a weighted average of the median values based at least partially upon the likelihood, wherein the likelihood is used as a weighting factor.

* * * * *